(12) United States Patent
Allard

(10) Patent No.: US 6,464,401 B1
(45) Date of Patent: Oct. 15, 2002

(54) HIGH LOAD CAPACITY BI-DIRECTIONAL TAPERED ROLLER BEARING

(75) Inventor: Kenneth L. Allard, Wilbraham, MA (US)

(73) Assignee: United Technologies Corporation, Hartford, CT (US)

( * ) Notice: Subject to any disclaimer, the term of this patent is extended or adjusted under 35 U.S.C. 154(b) by 28 days.

(21) Appl. No.: 09/771,194

(22) Filed: Jan. 26, 2001

(51) Int. Cl.[7] .............................................. F16C 33/58
(52) U.S. Cl. ...................................... 384/571; 384/561
(58) Field of Search ................................ 384/571, 561, 384/564, 569, 426, 266

(56) References Cited

U.S. PATENT DOCUMENTS

| | | | | |
|---|---|---|---|---|
| 1,194,918 A | * | 8/1916 | Wright ........................ 384/571 |
| 1,961,134 A | * | 6/1934 | Buckwalter ................. 384/475 |
| 3,951,483 A | * | 4/1976 | Nakamura ................... 384/565 |
| 4,086,759 A | * | 5/1978 | Karstensen et al. ......... 184/6.11 |
| 4,634,300 A | * | 1/1987 | Takebayashi et al. ....... 384/492 |
| 4,787,758 A | * | 11/1988 | Jacob ...................... 29/898.062 |
| 5,009,523 A | * | 4/1991 | Folger et al. ................ 384/475 |
| 5,494,358 A | * | 2/1996 | Dougherty ................... 384/448 |
| 5,735,612 A | | 4/1998 | Fox et al. .................... 384/448 |
| 6,239,704 B1 | * | 5/2001 | Olson ....................... 340/568.2 |

* cited by examiner

Primary Examiner—Thomas R. Hannon
Assistant Examiner—Julie K. Smith

(57) ABSTRACT

The present invention is a bi-directional tapered roller bearing having a first cone rib ring thrust face "C" adjacent and facing the small diameter end faces of the roller elements, a second cone rib ring thrust face "B" adjacent and facing the large diameter end faces of the roller elements, and a cup rib ring thrust face "A" adjacent and facing the large diameter end faces of the roller elements. The bearing components are arranged such that, during primary thrust load operation, there is a gap between thrust face C and the small diameter end faces of the roller elements, a gap between thrust face A and the large diameter end faces of the roller elements, and contact between thrust face B and the large diameter end faces of the roller elements. With this arrangement, bearing roller element centrifugal loads act to reduce the contact forces between the roller elements and the bearing races.

6 Claims, 2 Drawing Sheets

HIGH LOAD CAPACITY BI-DIRECTIONAL TAPERED ROLLER BEARING

BACKGROUND OF THE INVENTION

1. Technical Field

The invention relates to tapered roller bearings with the ability to handle thrust loads in both axial directions.

2. Background Information

Roller bearings for handling thrust loads in both axial directions are well known in the art and are sometimes referred to as bi-directional tapered roller thrust bearings. One application for such bearings is as a main shaft bearing for a gas turbine engine. Gas turbine engine major or "primary" bearing thrust loads are in one of either the forward or rearward directions, but there are circumstances where the bearings must deal with significant, but much smaller "minor" bearing thrust loads in the opposite or reverse direction from the primary loads. (Hereinafter, "reverse" thrust loads means thrust loads that are in the opposite direction of the primary thrust loads.) A bi-directional tapered roller bearing is able to handle both the major and minor thrust loads, thereby eliminating the need for a costly, energy consuming thrust balance mechanism, or eliminating the need for a second, smaller thrust bearing for accommodating the minor reverse thrust loads.

One such bi-direction roller thrust bearing is shown and described U.S. Pat. No. 5,735,612 "Single Row Tapered Roller Bearing" by G. P. Fox and J. R. Dietric, incorporated herein by reference. In its basic form the bi-directional tapered roller thrust bearing has an inner annular tapered race on its cone and an outer annular tapered race on its cup, with tapered roller elements disposed circumferentially in the space therebetween for rolling contact between the roller elements tapered surfaces and the inner and outer races. At the large diameter end of the cup race a cup rib face extends radially inwardly adjacent the large diameter ends of the roller elements; and at the small diameter end of the cone race a cone rib face extends radially outwardly adjacent the small diameter ends of the roller elements. During primary thrust operation, the large diameter ends of the roller elements press against the cup rib face; but most of the major thrust loads are transferred from the cone into the cup (and thence into the structure supporting the cup) through the roller elements via the line contact between the roller element tapered rolling surfaces and the races. This is due to the fact that under primary thrust loads the roller elements are "wedged" between the races.

On the other hand, during reverse thrust loading, the roller elements are substantially unloaded from contact with the races. The cone rib face presses against the small diameter ends of the roller elements, and the cup rib face presses against the large diameter ends of the roller elements, thereby transferring the reverse thrust load through the roller elements from the cone rib to the cup rib in a direction generally perpendicular to the end faces of the roller elements.

The drawback of prior art bi-directional tapered roller bearings occurs during primary thrust loading, not reverse thrust loading. When experiencing primary thrust loads, the contact forces between the bearing races and the tapered rolling surfaces of the roller elements have turned out to be too large for some applications, such as where space is at a premium, and low weight coupled with long life are required. One such application is gas turbine aircraft engines. For example, if a prior art bi-directional tapered roller bearing having the requisite life expectancy is too large for the available space, then it cannot be used. Or, if the space is available, the weight penalty may be unacceptable. In either case, the benefits of the bi-directional tapered roller bearing would not be available for that application. It is desired to have a bi-directional tapered roller bearing that does not have the aforementioned drawback.

BRIEF SUMMARY OF THE INVENTION

The present invention is a bi-directional tapered roller bearing having a first cone rib ring thrust face (face "C", for future reference) adjacent and facing the small diameter end faces of the roller elements, a second cone rib ring thrust face (face "B", for future reference) adjacent and facing the large diameter end faces of the roller elements, and a cup rib ring thrust face (face "A", for future reference) adjacent and facing the large diameter end faces of the roller elements, the bearing components being constructed and designed such that during primary thrust load operation there is a gap between thrust face C and the small diameter end faces of the roller elements and a gap between thrust face A and the large diameter end faces of the roller elements, and at the same time there is contact between thrust face B and the large diameter end faces of the roller elements.

In the prior art bi-directional tapered roller bearing configuration of U.S. Pat. No. 5,735,612, cited above, there are only thrust faces corresponding to thrust faces A and C. There is no thrust face B. As discussed in the Background Information section of this specification, in the prior art bearing the primary thrust loads were forcing the large diameter end faces of the roller elements against thrust face A. In accordance with the present invention, by adding a thrust rib ring (with its thrust face B) to the bearing at the large diameter end of the cone race, and by maintaining a gap between thrust face A and the large diameter end faces of the roller elements during primary thrust operation, the primary thrust loads now force the roller element end faces against thrust face B. The result is that bearings of the present invention will have significantly lower contact forces between the roller elements and races, as compared to the race contact forces on the same size bi-directional tapered roller bearings of the prior art. The reason for the lower contact force on the races is that the centrifugal forces generated by the roller elements during primary thrust load operation add to the contact forces against the cup race of the prior art design, but subtract from the contact forces against the cone race of the present invention.

In applications where high contact forces between the roller elements and races of a prior art bi-directional bearing necessitate the use of a bearing that is undesirably large in order to achieve a certain desired life expectancy, the present invention allows the use of a smaller bearing. Alternatively, the substitution of a prior art bi-directional bearing with a bearing of the present invention of the same size results in a longer bearing life. As stated earlier, the bearing of the present invention is particularly useful in aircraft gas turbine engines, where weight is critical and space is limited. For one particular gas turbine engine application it was estimated that the present invention could increase the bearing life by a factor of four or more compared to the same size bi-directional tapered roller bearing design of the prior art.

The foregoing features and advantages of the present invention will become more apparent in light of the following detailed description of exemplary embodiments thereof as illustrated in the accompanying drawings.

DETAILED DESCRIPTION OF THE INVENTION

Figure 1:
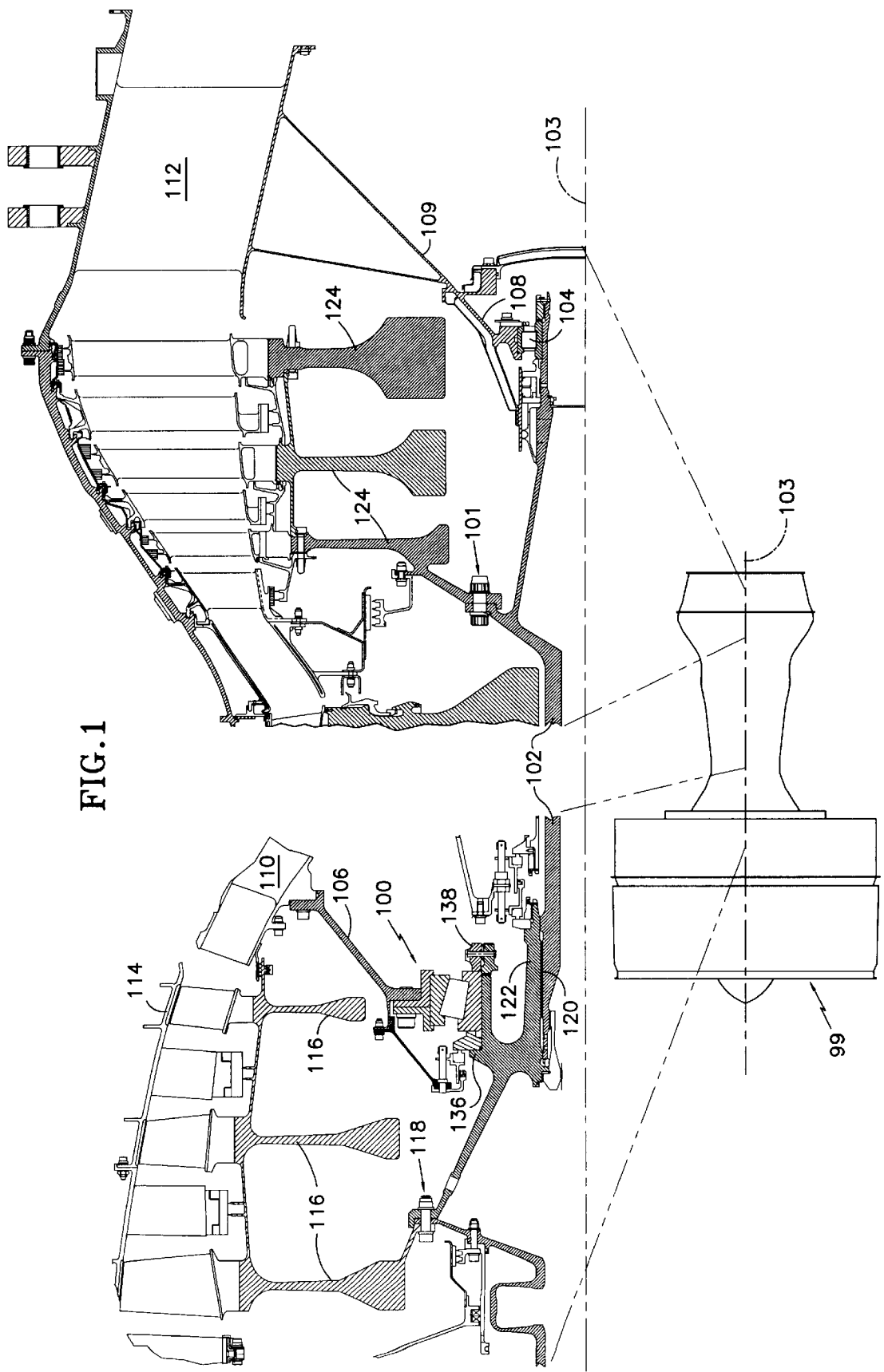
FIG. 1 is a fragmentary, simplified, cross-sectional view of a gas turbine engine having a bearing according to the present invention incorporated therein.

With reference to FIG. 1, an external view of an aircraft gas turbine engine 99 is depicted in the lower portion of the Figure. Enlarged, simplified cross sectional views of internal engine portions are depicted above the external view, with their location within the engine indicated by phantom lines.

A bi-directional tapered roller thrust bearing 100 according to the present invention is shown as the sole thrust bearing supporting the forward end of a shaft 102 which connects the low compressor and low turbine of the engine 99. The rotational axis of the shaft 102 is designated by the reference numeral 103. A conventional roller bearing 104 supports the rear end of the shaft 102. If desired, the bi-directional tapered roller bearing of the present invention could be placed at the rear of the shaft, with the conventional roller bearing at the front. The bearings facilitate rotation of the shaft, and are secured to the shaft and to non-rotating engine structure by well known means (such as flanged cones 106, 108, 109, intermediate case strut 110, turbine exit guide vane 112, and case 114), and ultimately to an engine mount system (not shown) which secures the engine to the aircraft. A plurality of compressor disks 116 are fixedly connected to the forward end of the shaft 102 by suitable means, such as a flange and bolt arrangement generally represented by the reference numeral 118, and a spline connection 120 between a stub shaft 122 and the shaft 102. A plurality of turbine disks 124 are fixedly secured to the rear end of the shaft 102, such as by flanged conical member 101. Thrust loads in either direction, as well as radial loads, are transferred from the shaft 102, through the bi-directional tapered roller bearing 100 and into the non-rotating structure. For purposes of this description it is assumed the primary engine thrust load is a rearward thrust load, and the reverse (i.e. minor) thrust load is a forward thrust load.

Details of the means and manner of securing the compressor and turbine components to the shaft, as well as sealing arrangements between rotating and non-rotating components are not a part of the present invention and, to the extent shown and described, are for reference purposes only.

Figure 2:
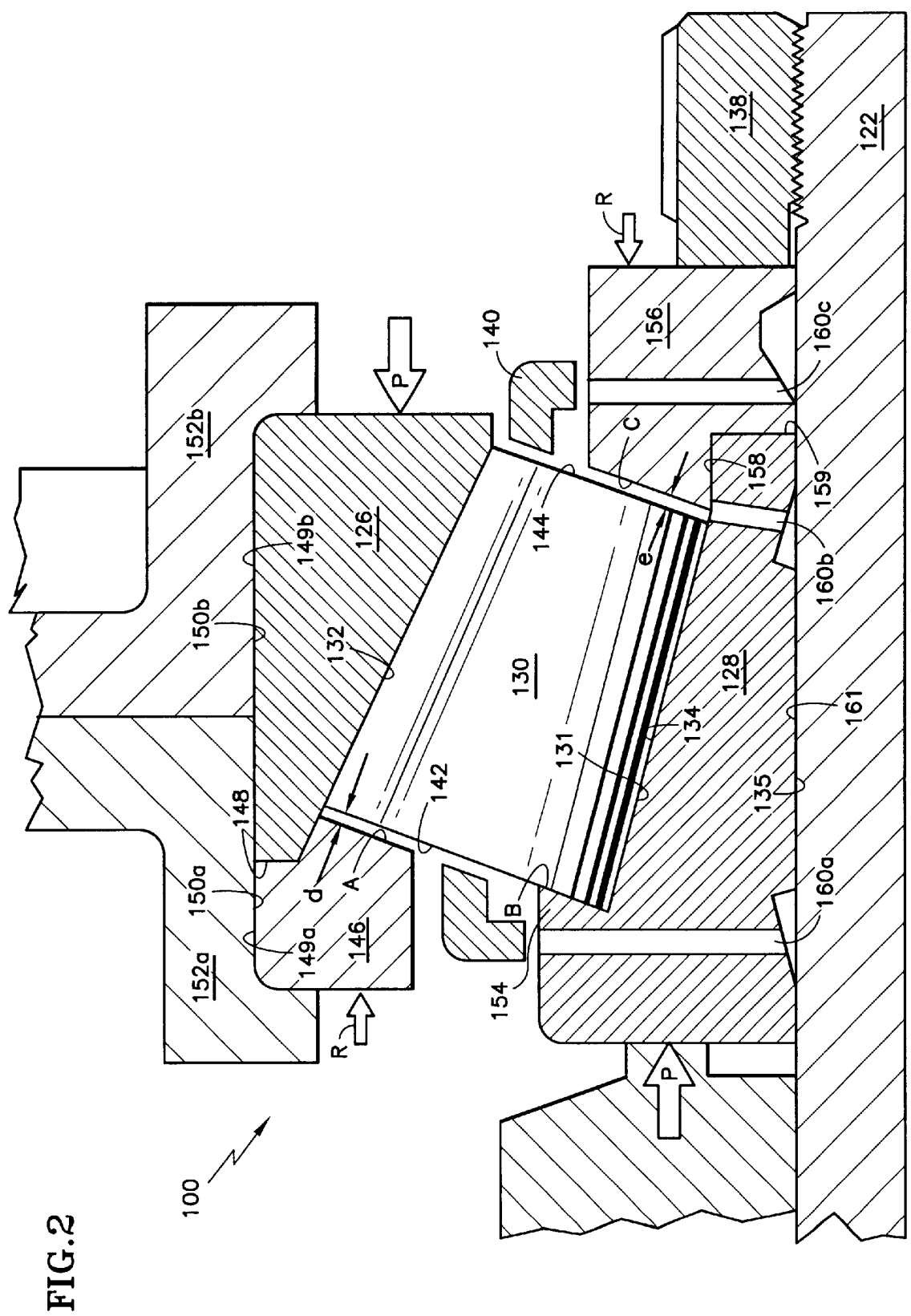
FIG. 2 is an enlarged, sectional view of the bearing of the present invention shown in FIG. 1.

The present invention is best understood with reference to the enlarged drawing of the bi-directional tapered roller bearing 100 in FIG. 2. The bearing includes an outer annular cup 126, an inner annular cone 128, and a plurality of tapered roller elements 130, only one of which is shown in the drawing. Each rolling element 130 has a rolling surface 131. An inwardly facing annular surface 132 of the cup is concentric with the shaft axis 103 and is the outer race (or cup race) of the bearing. The outer race tapers from a larger diameter at its forward end to a smaller diameter at its rearward end, and surrounds and is radially spaced from an outwardly facing annular surface 134 of the cone 128. The surface 134 is the inner race (or cone race) of the bearing and is also concentric with the shaft axis 103. Like the outer race, the inner race tapers from a larger diameter at its forward end to a smaller diameter at its rearward end. An outer surface 135 of the cone fits tightly over the outwardly facing cylindrical surface of the stub shaft 122, and is located axially by a stack-up of parts between an annular locating rib 136 (FIG. 1) on the stub shaft 122, and a ring nut 138. The cone 128 is unable to rotate relative to the shaft 102. The tapered rollers, trapped within a cage 140 which maintains a uniform spacing between them, are circumferentially disposed in a single row within the annular space between the inner and outer races. Each of the rollers tapers from a larger diameter end face 142, facing forward, to a smaller diameter end face 144, facing rearward.

Adjacent the forward end of the cup 126 and fixed relative thereto is a forward cup ring 146. In this embodiment the cup ring and the cup are two separate rings that mate at an interface 148; however, they may be integral with each other, if desired, and as long as the bearing is otherwise constructed so that assembly is possible. The radially outwardly facing cylindrical surfaces 149a and 149b of the forward cup ring 146 and the cup 126, respectively, fit tightly on the radially outwardly facing cylindrical surfaces 150a and 150b of stationary annular bearing housing members 152a, 152b, respectively. The housing members hold the cup ring 146 and cup 126 in abutting relationship, and prevent their axial movement. The cup ring 146 includes an annular thrust face "A" which extends radially inwardly from the larger diameter forward end of the outer race 132 adjacent and facing a portion of the large diameter end faces 142 of the roller elements. A gap "d" exists between the thrust face A and the roller element end faces 142 when the primary rearward thrust load pushes the roller elements 130 toward the rear.

At the radially outermost end of the inner race surface 134 and integral with the cone 128 is a forward cone ring 154 having an annular thrust face "B" extending radially inwardly adjacent and facing a portion of the larger diameter end faces 142 of the roller elements. If desired, the forward cone ring 154 need not be integral with the cone 128, but could be a separate ring fixed axially relative to the cone 128.

At the radially innermost end of the inner race surface 134 the bearing includes a rear cone ring 156 having an annular thrust surface "C" extending radially inwardly adjacent and facing a portion of the smaller diameter end faces 144 of the roller elements. The ring 156 fits tightly on a cylindrical surface 158 of the cone 128, and is also forced axially against the rearwardly facing surface 159 of the cone 128 by the ring nut 138. The distance between the thrust faces B and C is greater than the length of the roller elements by an amount "e", which, in FIG. 2, is shown as a gap between the roller element end faces 144 and thrust face C.

Radial oil holes 160a, 160b, and 160c are shown extending through, respectively, the thrust ring 154, cone 128, and thrust ring 156. Appropriate passages (not shown are provided between the radially outwardly facing surface 161 of the stub shaft 122 and the radially inwardly facing surfaces of the cone 128 and cone ring 156 to assure that oil reaches the oil holes; however, the bearing oiling system is not a part of the present invention.

The bearing 100 operates as follows: Primary engine thrust loads on the bearing 100 are represented in FIG. 2 by the large arrows labeled "P". The load P acts to move the shaft 102 in a rearward direction relative to the stationary engine structure, such as the outer bearing housing members 152a and 152b. More specifically, the load P acts through thrust face B and the cone race 134 to push the roller elements 130 rearwardly, increasing the contact force of the roller elements against the race surfaces 132, 134 as the race surfaces move toward each other. While almost all of the primary thrust load P passes through the roller elements into the stationary structure via contact between the roller elements and the race surfaces, there is a resultant contact force "F" (not depicted in the drawing) acting on the roller element end faces 142 and thrust face B as those surfaces rub together. At the same time, a gap e exists between the roller element end faces 144 and the thrust face C, and a gap d exists between the roller element end faces 142 and thrust face A.

During the occurrence of a reverse thrust load, such as may happen when there is a compressor surge, a thrust load acts on the bearing in the manner represented by the small arrows labeled "R". The reverse thrust load R is much smaller than the primary thrust load P. The load R acts to move the cone and cup race surfaces apart, unloading the roller elements and bringing the thrust faces A and C into contact with the roller element end faces 142 and 144, respectively.

The following is a comparison of the bearing race contact forces generated in a prior art bi-directional tapered roller bearing (i.e. such as shown and described in U.S. Pat. No. 5,735,612) and in a bi-directional tapered roller bearing according to the present invention, assuming the same size bearings under the same operating conditions. Prior art bearing: As hereinabove explained, in prior art bi-directional tapered roller bearings there is no thrust face corresponding to the thrust face B of the present invention. During primary thrust loading, with no thrust face B, the rearwardly facing roller element end faces 144 are pushed against thrust face A by the thrust load P. In addition, an axial component of the roller element centrifugal forces acts on the cup in the same direction as the thrust load acts on the cup. The resulting loads on the bearing raceways are, therefore, greater than the loads created solely by the thrust load. Bearing of the present invention: With the present invention, during primary thrust loading, the roller elements contact thrust face B. In that situation, the axial component of the roller element centrifugal forces acts on the cone in a direction opposite the direction of the thrust load on the cone. The resulting loads on the bearing raceways are, therefore, less than the loads created solely by the thrust load. Theoretically, there is a bearing speed at which the axial component of the centrifugal forces will exactly balance the thrust load, virtually unloading the bearing.

It is clear from the foregoing that, for bearings of the same size operating under the same primary thrust load conditions, the race contact forces in a bearing of the present invention is significantly less than the race contact force in a prior art bi-directional tapered roller bearing. As previously mentioned, for one particular application it was estimated that, due to the reduced race contact forces under primary thrust load conditions, a bearing of the present invention was estimated to have a life expectancy at least four times longer than a similarly sized prior art bi-directional tapered roller bearing.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A bi-directional bearing for facilitating rotation about an axis, which is the bearing axis, said bearing constructed and arranged to operate under both primary axial thrust loads and reverse axial thrust loads, said bearing comprising:

a cup having an annular race tapered such that said race has a large diameter end and a small diameter end;

a cone having an annular race spaced radially inwardly from said cup race, said cone race being tapered such that said cone race has a large diameter end and a small diameter end;

a plurality of tapered rollers, each having a rolling surface, a small diameter end face at one end of said rolling surface, and a large diameter end face at the other end of said rolling surface, said roller elements being circumferentially spaced apart in a single row between said cup race and cone race and contacting said races along said rolling surfaces;

a cup thrust rib ring fixed relative to said cup for carrying reverse axial thrust loads, said cup thrust rib ring having an annular thrust face "A" at said large diameter end of said cup race and extending radially inwardly therefrom, said large diameter end face of each of said roller elements being disposed adjacent and facing thrust face A;

a first cone thrust rib ring fixed relative to said cone for carrying primary axial thrust loads, said first cone thrust rib ring having an annular thrust face "B" at said large diameter end of said cone race and extending radially outwardly therefrom, said large diameter end face of each of said roller elements being disposed adjacent and facing thrust face B;

a second cone thrust rib ring fixed relative to said cone for carrying reverse axial thrust loads, said second cone thrust rib ring having an annular thrust face "C" at said small diameter end of said cone race and extending radially outwardly therefrom, said small diameter end face of each of said roller elements being disposed adjacent and facing thrust face C, the distance between thrust faces B and C being greater than the length of said rollers;

said bearing further constructed and arranged to have (i) said roller large diameter end faces moveable into load bearing contact with said thrust face B while being spaced from thrust face A upon the application of primary axial thrust loads on said cup and cone urging said cup race and cone race toward each other, and ii) said roller large and small diameter end faces moveable into load bearing contact with, respectively, thrust face A and thrust face C upon the application of reverse axial thrust loads on said cup and cone urging said cup race and cone race apart.

2. The bearing according to claim 1, wherein said bearing is a main shaft thrust bearing for a gas turbine engine.

3. The bearing according to claim 1, wherein said first cone thrust rib ring is integral with said cone.

4. In a gas turbine engine, the engine including non-rotating structure and having a shaft supported from and rotatable within said structure, said shaft having at least one compressor disk fixedly secured to one end of said shaft and at least one turbine disk fixedly secured to the other end of said shaft, a bi-directional tapered roller bearing disposed on one end of said shaft for facilitating the rotation of said shaft and for transferring both primary and reverse axial thrust loads to said structure, said roller bearing including:

(a) a cup having an annular race tapered such that said cup race has a large diameter end and a small diameter end;

(b) a cone having an annular race spaced radially inwardly from said cup race, said cone race being tapered such that said cone race has a large diameter end and a small diameter end;

(c) a plurality of tapered roller elements, each having a rolling surface, a small diameter end face at one end of said rolling surface, and a large diameter end face at the other end of said rolling surface, said roller elements being circumferentially spaced apart in a single row between said cup race and cone race and contacting said races along said rolling surfaces; an improvement wherein said bearing further comprises:

(i) a cup thrust rib ring fixed relative to said cup, said cup thrust rib ring having an annular thrust face "A" at said large diameter end of said cup race and extending radially inwardly therefrom, said large diameter end face of each of said roller elements being disposed adjacent and facing thrust face A;

(ii) a first cone thrust rib ring fixed relative to said cone, said first cone thrust rib ring having an annular thrust face "C" at said small diameter end of said cone race and extending radially outwardly therefrom, said small diameter end face of each of said roller elements being disposed adjacent and facing thrust face C, said thrust faces A and C being moveable into load bearing contact with, respectively, said large diameter end face of each of said rollers and said small diameter end face of each of said rollers upon the application of reverse axial thrust loads on said cup and cone that urge said cup race and said cone race further apart; and (iii) a second cone thrust rib ring fixed relative to said cone, said second cone thrust rib ring having an annular thrust face "B" at said large diameter end of said cone race and extending radially outwardly therefrom, said large diameter end face of each of said roller elements being disposed adjacent and facing thrust face B, the distance between thrust faces B and C being greater than the length of said rollers, said thrust face B being moveable into load bearing contact with said large diameter end face of each of said roller elements upon the application of primary axial thrust loads on said cup and said cone that urge said cup race and said cone race closer together.

5. The improvement according to claim 4, wherein said cone is fixed relative to said shaft and rotates with said shaft.

6. The improvement according to claim 5, wherein said second cone thrust rib ring is integral with said cone.

* * * * *